June 9, 1959  C. N. KIMBERLIN, JR., ET AL  2,890,179
HYDROFORMING CATALYST
Filed Jan. 3, 1956  3 Sheets-Sheet 1
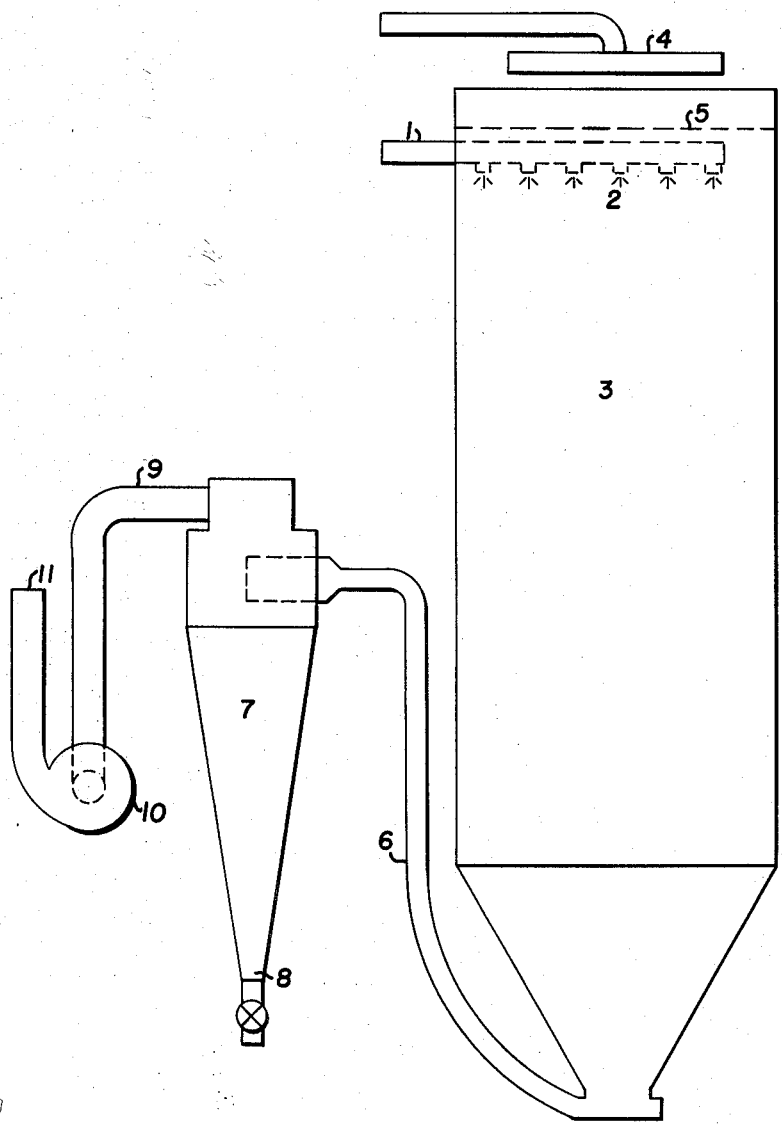
FIGURE-I
Charles Newton Kimberlin, Jr.
Frederick Williams Steffgen   Inventors
By H. M. Heyner  Attorney June 9, 1959  C. N. KIMBERLIN, JR., ET AL  2,890,179
HYDROFORMING CATALYST
Filed Jan. 3, 1956  3 Sheets-Sheet 2
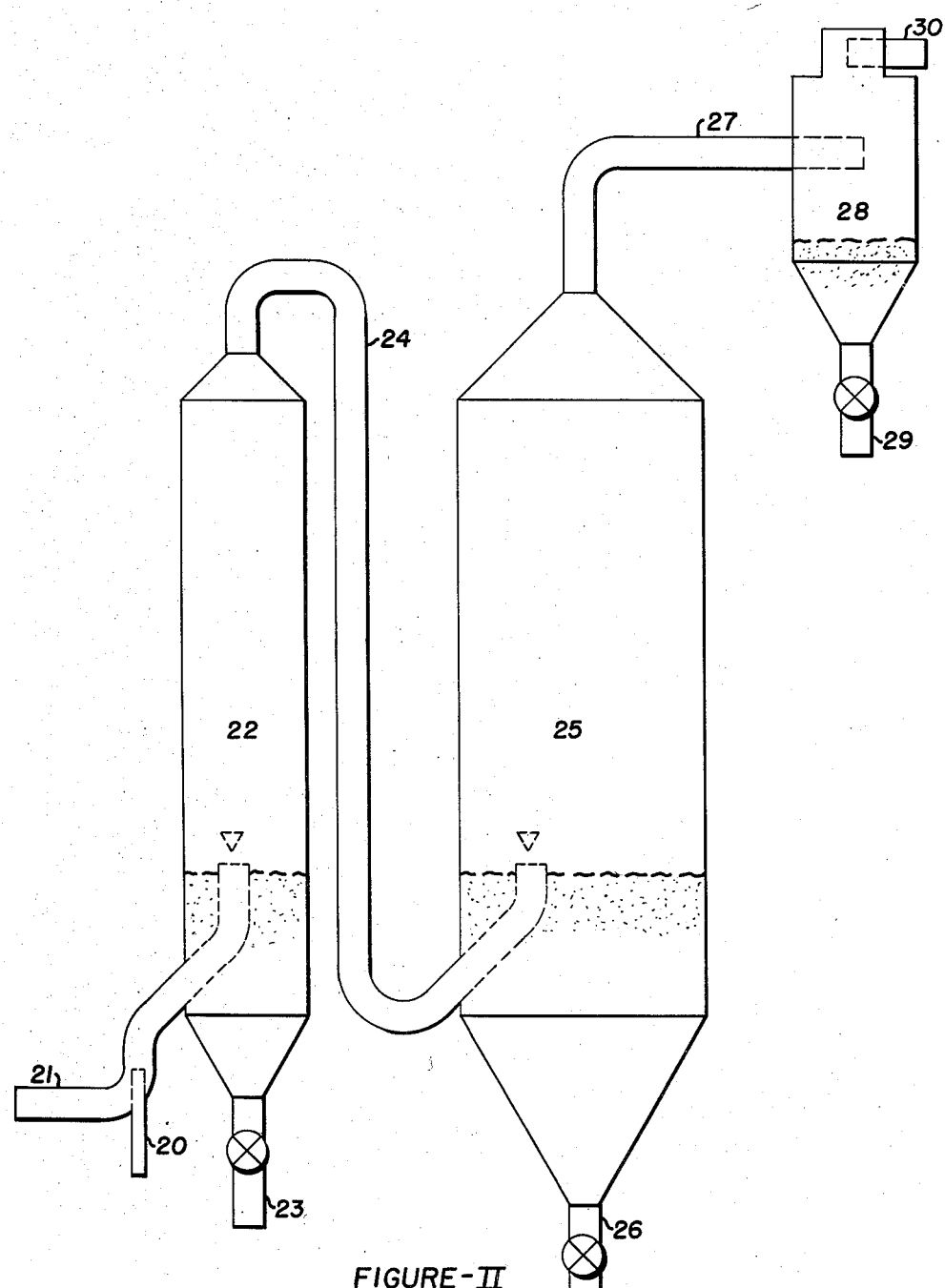
FIGURE-II
Charles Newton Kimberlin, Jr.
Frederick Williams Steffgen    Inventors
By H. M. Feyrer  Attorney June 9, 1959  C. N. KIMBERLIN, JR., ET AL  2,890,179
HYDROFORMING CATALYST
Filed Jan. 3, 1956  3 Sheets-Sheet 3
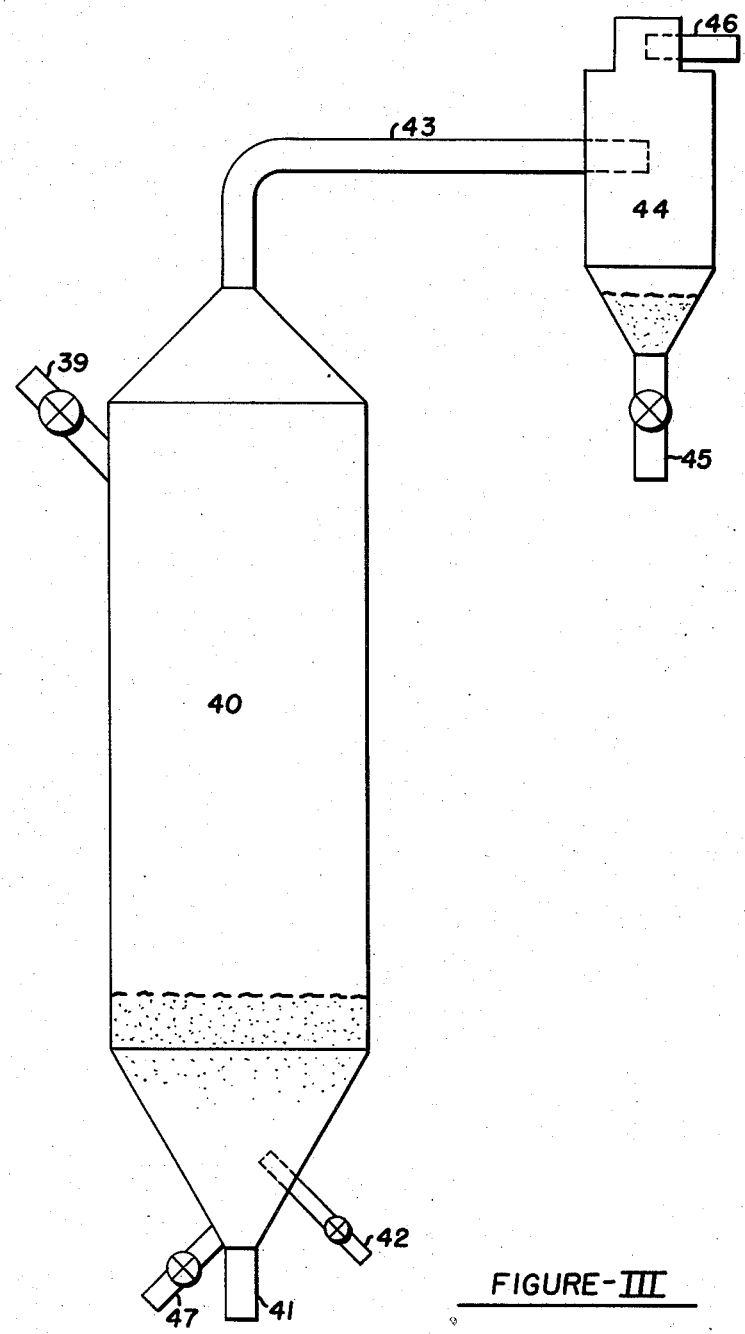
FIGURE-III
Charles Newton Kimberlin, Jr.
Frederick Williams Steffgen  Inventors
By H. M. Feyrer  Attorney United States Patent Office 2,890,179
Patented June 9, 1959

2,890,179

HYDROFORMING CATALYST

Charles Newton Kimberlin, Jr., and Frederick Williams Steffgen, Baton Rouge, La., assignors to Esso Research and Engineering Company, a corporation of Delaware Application January 3, 1956, Serial No. 557,115

10 Claims. (Cl. 252—466)

This invention relates to catalysts and a method of preparing catalysts and particularly to platinum-containing catalysts which are especially useful in the hydroforming of petroleum fractions which boil in the motor gasoline or naphtha boiling range.

Hydroforming may be defined as an operation in which a petroleum naphtha or gasoline fraction is contacted at elevated temperatures and pressures in admixture with recycled hydrogen-rich process gas with solid catalysts under conditions of temperature, pressure and contact time such that there is no net consumption of hydrogen. Hydroforming processes involving the use of group VI metal oxides such as molybdenum oxide as well as with platinum-containing catalysts are well known.

A large number of platinum hydroforming units have been constructed in the last five to seven years. A serious deterrent to further or more general adoption of this process has been the cost of the catalyst itself and the failure of platinum-alumina catalysts to perform satisfactorily in fluidized solids type operations. Catalysts consisting essentially of about 0.5 wt. percent platinum or about 99.5 wt. percent of alumina have been widely used. Such catalyst, which costs upwards of about eleven dollars per pound, contain platinum in sufficient amounts to represent more than half of the total catalyst cost. Obviously any method which permits a substantial reduction in the amount of platinum used and which will still give a catalyst of satisfactory activity and selectivity characteristics would be highly desirable since it would bring about a very substantial reduction in the cost of the catalyst. A reduction of several dollars a pound is very significant in itself and becomes an extremely important economic factor when multiplied by several thousand pounds or the necessary catalyst inventory for a commercial plant of even moderate capacity.

Fluid hydroforming processes using platinum-containing catalysts have not been particularly successful. In the first place the most active catalysts developed have been those in which the platinum has been deposited upon alcoholate alumina. These catalysts have not been satisfactory for fluidized solids operations because of their softness or lack of attrition resistance. This not only leads to difficulties in fluidization because of lack or loss of control of particle size but also to serious economics problems because of the loss of platinum in the catalyst fines passing through the ordinary solids recovery equipment.

It is the object of this invention to provide the art with an improved method of preparing noble metal or platinum-alumina type catalysts.

It is also the object of this invention to provide the art with a method of preparing platinum-alumina hydroforming catalysts of low platinum content but having good activity and selectivity characteristics.

It is a further object of this invention to provide a method of preparing platinum-alumina hydroforming catalysts which are especially suitable for use in fluidized solids processes.

These and other objects will appear more clearly from the detailed specification and claims which follow.

It has now been found that attrition resistant platinum-alumina or palladium-alumina hydroforming catalysts of low platinum content but having high specific activity can be obtained by spray drying a pure alumina hydrosol, preferably of the alcoholate type, segregating a fraction of the alumina having a particle size within the range of 40 to 80 microns, incorporating about 0.3 to about 2.0 wt. percent platinum or from 0.5 to 5.0 wt. percent palladium on this narrow particle size range alumina and then diluting this high metal content catalyst or catalyst concentrate with other alumina having a wide particle size range of say 10 to about 200 microns to form a final catalyst composition comprising 0.005 to about 0.2 wt. percent platinum or from 0.05 to 1.0 wt. percent palladium. In a preferred embodiment the spray dried alumina hydrosol is subjected to attrition to break up any weak particles before segregating the 40-80 micron range particles upon which the platinum or palladium is deposited. The fines formed in this attrition may be recycled by peptizing, combining with additional alumina hydrosol and spray drying or the fines may be utilized as diluent alumina. In a further specific embodiment, the alumina particles used as diluent may be treated with alkaline materials and calcined to render the alumina inert.

The fact that the particles in the 40 to 80 micron range have a lower rate of attrition than either larger or smaller particles was clearly demonstrated by the following experiment. A sample of fluidizable alumina having particles in the size range of 10 to 120 microns was separated by elutriation into fractions having particles size ranges of 10 to 40 microns, 40 to 80 microns, and 80 to 120 microns. The separate fractions were then "tagged" by impregnation with small amounts of different metallic compounds so that in subsequent attrition tests fines produced from any fraction could be identified by means of a spectrographic analysis. The tagged particle size fractions were re-blended in the proportions in which they had occurred in the original sample and the material was subjected to a laboratory attrition test. In this test the alumina was subjected to the action of a single jet of air having a velocity of 460 ft./sec. and the fines (20 micron or smaller particles) produced by the jetting action were elutriated out of the mass of alumina and collected in a filter. The fines collected were weighed at hourly intervals and the source of the fines was determined by analysis by emission spectrograph. From the data thus collected the attrition rates of the various particle size fractions of the alumina were found to be as follows:

| Particle Size | Attrition Rate, Wt. Percent Disintegration to Fines per Hour |
|---|---|
| 40 Microns and Smaller | 7 |
| 40 to 80 Microns | 1.5 |
| 80 Microns and Larger | 5 |

The alumina utilized as the support for the platinum in accordance with the present invention should be of very high purity. The alumina hydrosol may be prepared by the Patrick process but is preferably prepared from aluminum alcoholate by the addition of glacial acetic acid to the alcoholate and hydrolyzing. The preparation of the aluminum alcoholate as well as of the alumina hydrosol is described in U.S. Patent No. 2,636,865 and 2,656,321, and reference is made thereto for a detailed description thereof. For the preparation of microspherical alumina by spray drying a hydrosol having a concentration of about 3% to 5% by weight of alumina is preferred. No aging or other special pretreatment of the hydrosol before spray drying is necessary.

Reference is made to the accompanying drawings illustrating, diagrammatically in Fig. 1 a suitable arrangement for spray drying alumina hydrosols to form spherical particles, in Fig. 2 a suitable arrangement for segregating particles of certain particle size ranges and in Fig. 3 an arrangement for attriting the alumina particles to break down the softer alumina particles.

A simple and economical way to transform alumina hydrosol into solid alumina of the particle size range desired for fluid solids processes is to spray dry the hydrosol. A No. 9 Zizinia Spray Drier has been successfully used to spray dry alumina hydrosol to give alumina with the proper particle size range. With the aid of the schematic drawing, Fig. 1, the spray drying step can be described in some detail. A hydrosol containing 4% alumina and heated to 150° F. is pumped at 150–175 p.s.i.g through line 1 to 3, hollow cone spray nozzles located approximately at 2. Droplets of hydrosol are thus discharged into drying chamber 3 and are carried downward in a current of hot gases. Atmospheric air is drawn into the drying chamber and in so doing is heated by the five ring, gas-fired burners located at 4 and the hot gases are mixed via a distributor plate 5. For optimum drying conditions the temperature in the vicinity of 2 is maintained at 450–480° F. which gives a temperature in the bottom section of 3 of 210–230° F. The latter temperature, 210–230° F. is critical and other conditions of spray drying are adjusted to give the desired temperature range. Microspherical alumina formed in 3 is then blown into cyclone 7 via line 6. The alumina is collected at 8, the bottom of the cyclone. The hot gases are withdrawn through line 9 by exhaust blower 10 and vented to the atmosphere through line 11.

In this manner a 4% alumina hydrosol has been spray dried at a rate to give 8½ pounds of dry alumina per hour. The alumina so formed contains 30–35% volatile material. This material is made up of particles covering a spectrum of sizes, 95% or more of which have diameters in the range of 10 to 100 microns. It has been found that best results are obtained when the platinum is deposited upon the 40 to 80 micron range alumina particles since this narrow particle size range material is much more resistant to breakdown into fines during attrition than either the smaller or larger size particles. Therefore the spray dried alumina microspheres are segregated according to particle size to give a fraction consisting of the desired 40 to 80 micron range. This may be accomplished in several ways but most conveniently the microspheres are separated in an elutriating current of air.

Figure 2 shows a schematic flow-plan for segregating alumina microspheres according to their diameters. Alumina microspheres are entrained in a jet of air through line 20 which blows the alumina as a dispersed phase into line 21. Air is blown through line 21 into vessel 22 carrying the alumina with it. The jet of air from line 21 is modified by baffles to give a smooth flow of air upward through vessel 22. The velocity of air is adjusted so that the 80+ micron material will settle into the lower portion of vessel 22 and may be withdrawn at 23. The 80− micron alumina particles pass upward through the vessel 22 and are carried out via line 24. The linear velocity in vessel 22 necessary to accomplish this goal is a function of the density of the alumina. A velocity in the neighborhood of 0.90 ft./sec. has been required for experimental batches of spray dried, gel type alcoholate alumina. The 80− micron material passes from line 24 into vessel 25 which has a diameter twice that of vessel 22. Thus the linear velocity in 25 is one-fourth that of vessel 22. The jet of air passing into 25 is modified by baffles to give smooth flow upward through the vessel. Particles in the 40 to 80 micron range settle out into the lower section of 25 and may be withdrawn by the bottom draw-off line 26. Air containing 40− micron fines passes through line 27 into cyclone 28 which separates the alumina fines from the air. The fines drop to the bottom of vessel 28 and may be withdrawn via line 29. Air is vented to the atmosphere through line 30.

In order to maximize the attrition resistance of the base upon which platinum is to be deposited, the 40 to 80 micron fraction selected for impregnation is subjected to an attritioning action to remove the weakest particles from this fraction. In Fig. 3 a schematic flow plan is suggested for accomplishing this end. Alumina of the desired particle size range, e.g. 40–80 microns, is charged to vessel 40 by means of line 39. The alumina is then fluidized by air issuing from line 41 through a distributor plate. Another line, 42, extends into the dense phase of the fluidized bed and terminates in the form of one or more jet nozzles. Air is passed through line 42 into vessel 40 at a rate such that each jet will accelerate the air to 400 to 600 ft./sec., preferably about 500 ft./sec. Furthermore, the combined air flows through 41 and 42 and is maintained at about 0.22 ft./sec. so that particles breaking down into 40− micron fines will be blown overhead through line 43 into cyclone 44. Fines may then be withdrawn through line 45 and air is vented at line 46. When the attrition rate declines showing that the fragile 40–80 micron materials have been attrited the air flow is discontinued and attrition resistant alumina in the 40–80 micron size range is withdrawn through line 47. It should be observed that vessels 25 and 28 of Figure 2 could be equipped to serve as vessels 40 and 44 in Fig 3. Thus the 40–80 micron material collecting in vessel 25 during the sizing operation could subsequently be attrited in the same vessel.

Prior to impregnation with platinum the attrition resistant alumina base must be calcined to remove volatile and combustible materials. Preferably this is accomplished in a fluidized bed in which the alumina is heated at 250 to 400° F. until the water content of the vent air is reduced to 0.1 atmosphere partial pressure or lower. Calcination is then performed at 800 to 1300° F. but preferably at 1100° F. for about 4 hours or until all combustible material is removed from the fluidized solid.

For impregnation with platinum the alumina is suspended in sufficient distilled or de-ionized water to form a thin, easily stirred suspension or slurry. The amount of water employed is not critical provided sufficient water is used to produce an easily stirred mixture; about 4 liters of water per 1000 grams of alumina is satisfactory, although a larger or smaller amount of water may be used if desired. While stirring the slurry of alumina in water at room temperature, about 65°–90° F., a solution of a platinum compound comprising the required amount of platinum to deposit about 0.3 wt. percent to 2.0 wt. percent platinum metal on the alumina is added slowly during the course of about one-half hour. The platinum compound is rapidly and completely adsorbed on the alumina. The concentration of the platinum compound added is not critical. The particular compound of platinum employed is not critical, provided it is of such a nature that it will be adsorbed by the alumina; it is preferred to use chloroplatinic acid and the preferred concentration is about 10%. The rate of addition of the platinum compound solution to the alumina slurry should be sufficiently slow so that at least about 15 minutes elapse during the addition; there is no advantage in prolonging the addition over a period substantially greater than one-half hour. If desired, certain adsorption modifiers may be added to the slurry of alumina in water prior to the addition of the platinum compound solution. These adsorption modifiers result in catalysts of somewhat improved activity. As adsorption modifiers one may employ free halogens or certain halogen compounds such as chlorine, bromine, aluminum chloride, ammonium chloride, and the like. The amount of adsorption modifier employed will be in the range of about 50% to 200% of the weight of the platinum metal to be deposited. After the addition of the platinum compound solution to the alumina slurry is complete, stirring is continued for an additional 15 minutes to one-half hour. The impregnated catalyst is now removed from the mixture, preferably by filtration, dried at about 250° F. and activated by calcining for about 4 hours at 1000° F.

The final catalyst composition is prepared by mixing the platinum concentrate with diluent solids to reduce the platinum content to approximately 0.005 to 0.2 wt. percent platinum and preferably to the range of about 0.05 to 0.1 wt. percent. The diluent solids can be active alumina from the same source as the alumina upon which the platinum is deposited or it may be another alumina in activated and preferably in thermally or chemically deactivated form.

It is advantageous, for example to use as diluent, alumina that has been calcined at temperatures of about 1400–1800° F. Alternatively the diluent alumina can be deactivated by treatment with about 0.5 to 5.0% of an alkaline material or a material which can be converted to an alkaline material by heating. Suitable treating agents comprise calcium nitrate, magnesium nitrate, sodium carbonate, potassium carbonate, sodium bicarbonate, sodium hydroxide and the like. After adding such alkaline treating agents the alumina is preferably calcined at a temperature of about 1200–1800° F., preferably about 1400–1600° F. Alternatively, the alumina or diluent may be treated or combined with other materials to impart additional catalytic activity. For example, silica in amounts of about 0.5 to 10 wt. percent or halogens such as chlorine or fluorine or aluminum chloride or fluoride in amounts of about 0.5 to 2.0 wt. percent may be added thereto. If desired, an entirely different diluent, such as magnesia or clay may be used as a partial or complete replacement for the alumina diluent. The mixture of platinum concentrate on 40–80 micron alumina microspheres with the platinum-free alumina on other diluent may be used as such to advantage in a fluid solids process wherein the catalyst is maintained as a captive bed or in a system wherein the solid catalyst and diluent mixture is continuously circulated between a hydroforming reaction zone and a regeneration zone wherein inactivating carbonaceous deposits are burned from the catalytic solids. The diluted catalyst composition may, if desired, be pelleted or extruded to form larger catalyst pieces more suitable for fixed bed operations.

The following examples are illustrative of the present invention.

EXAMPLE 1

An alumina hydrosol was prepared according to the method of U.S. Patent 2,656,321. To this end glacial acetic acid was added to a solution of aluminum amylate in excess amyl alcohol and petroleum solvent and the mixture was immediately hydrolyzed at 200° F. with sufficient water to produce a 3 wt. percent alumina hydrosol. The amount of acetic acid employed was 0.2 mol per mol of alumina. After separation of the organic phase the alumina hydrosol was converted to alumina microspheres by spray drying. The alumina microspheres produced in this example were employed in the preparation of the catalysts described in Examples 2, 3 and 4.

EXAMPLE 2

A portion of the alumina microspheres prepared in Example 1 were calcined for 4 hours at 1100° F. and impregnated with 0.6 wt. percent platinum. This was done by suspending the alumina in water and slowly adding the required amount of chloroplatinic acid while stirring. The impregnated alumina was filtered, dried at 250° F., and calcined 4 hours at 900° F.

Another portion of the alumina microspheres prepared in Example 1 was calcined for 4 hours at 110° F. and then blended with the impregnated microspheres to give a composite comprising 0.05 wt. percent platinum. The mixture was formed into 3/16 inch x 3/16 inch cylindrical pellets for fixed bed testing. This catalyst was designated catalyst A.

EXAMPLE 3

A portion of the alumina microspheres prepared in Example 1 was calcined for 4 hours at 1100° F. and impregnated with 0.6 wt. percent platinum in the manner described in Example 2.

Another portion of the alumina microspheres from Example 1 was calcined for 6 hours at 1500° F. and then blended with the impregnated microspheres to give a composite comprising 0.05 wt. percent platinum. The mixture was formed into 3/16 inch x 3/16 inch cylindrical pellets for fixed bed testing. This catalyst was designated catalyst B.

EXAMPLE 4

A low platinum content catalyst was prepared according to the prior art procedure as follows: A portion of the alumina microspheres prepared in Example 1 was calcined for 4 hours at 1100° F. and then impregnated with platinum by suspending the alumina in four times its weight of water and the mixture was stirred while adding a 10% chloroplatinic acid solution during the course of one-half hour. The amount of chloroplatinic acid employed was sufficient to deposit 0.05 wt. percent platinum metal on the alumina. The impregnated alumina was recovered by filtered, dried and calcined for 4 hours at 900° F. The catalyst was formed into 3/16 inch x 3/16 inch pellets for fixed bed testing. This catalyst was designated catalyst C.

EXAMPLE 5

Catalysts A, B and C were subjected to a fixed bed hydroforming test in order to compare their activities and selectivities in the hydroforming operation. In this test a virgin naphtha from South Louisiana crudes having a boiling range of about 230° F. to 308° F. and having an API gravity of about 54.5°, and having a research clear octane number of about 58.7 was passed in admixture with hydrogen gas over the catalyst at a temperature of 900° F. and at a pressure of 200 pounds per square inch. The amount of hydrogen gas employed was 5000 standard cubic feed per barrel of naphtha feed. In each test the feed rate was adjusted to give a $C_5+$ hydroformed product having a research clear octane number of 95.0. The data obtained are shown in Table I. It is evident from the data in the table that catalyst C which was prepared by distributing the small amount of platinum evenly over the alumina gave much poorer yields than catalysts A and B, which were prepared by distributing a large amount of platinum upon alumina and then admixing further amounts of alumina to form a low platinum content mixture. By comparing catalyst B with catalyst A, it is also evident that more favorable yields are obtained when the diluent alumina is calcined at a higher temperature than 1100° F.; a calcination temperature in the range of about 1400° to 1900° F. is more satisfactory. These catalysts have activities about one-sixth as great as the prior art catalysts containing 0.6 wt. percent platinum although they contain only one-twelfth as much platinum. In other words the specific activity of the platinum metal in the present catalysts in about twice that in the high (0.6%) platinum content catalysts of the prior art. With the same naphtha feed employed in this example prior art catalysts containing 0.6 wt. percent platinum give about 84 vol. percent of 95 octane number product. It is seen that the low platinum catalyst B prepared by the present procedure is substantially equivalent to these higher platinum content catalysts in selectivity.

Table I

[Hydroforming Tests: 900° F.; 5000 c.f. H₂/b.]

| Catalyst | Yield of C₅+ at 95 Clear Research Octane Number, Volume, Percent | Feed Rate (W./Hr./W.[1]) for 95 Octane Number |
| --- | --- | --- |
| A | 81.5 | 0.80 |
| B | 84.0 | 0.90 |
| C | 78.5 | 0.57 |

[1] Weight of naphtha feed per hour per weight of catalyst.

EXAMPLE 6

A sample of alumina microspheres, prepared by spray drying alcoholate alumina hydrosol, having a particle size distribution of 5.3 wt. percent 0–20 microns, 18 wt. percent 20–40, 62 wt. percent 40–80 microns and 14.7 wt. percent 80+ microns is calcined for about 4 hours at 1100° F. and converted to a catalyst by impregnation with 0.05 wt. percent platinum. The impregnation is accomplished by suspending the calcined alumina in water and adding slowly with stirring a solution of chloroplatinic acid containing sufficient platinum to deposit 0.05 wt. percent of platinum on the alumina. About one-half hour is required for the addition of the chloroplatinic acid solution. The impregnated catalyst is recovered by filtration, dried at about 250° F., and activated by calcining for about 4 hours at 900° F. This catalyst is designated Catalyst D.

EXAMPLE 7

A portion of spray dried alcoholate alumina microspheres, having a particle distribution of 5.3 wt. percent 0–20 microns, 18 wt. percent 20–40 microns, 62 wt. percent 40–80 microns, and 14.7 wt. percent 80+ microns, is calcined for about 4 hours at 1100° F. and impregnated with 0.6 wt. percent platinum in the manner described in Example 6. Another portion of the spray dried alcoholate alumina microspheres is calcined for about 4 hours at 1500° F. and blended with the platinum containing material to give a mixture having a platinum content of 0.05 wt. percent. This catalyst is designated Catalyst E.

EXAMPLE 8

A quantity of 40–80 micron particle size alumina microspheres is separated by elutriation from a sample of spray dried alcoholate alumina microspheres having an original particle size of 5.3 wt. percent 0–20 microns, 18 wt. percent 20–40 microns, 62 wt. percent 40–80 microns, and 14.7 wt. percent 80+ microns. The 40–80 micron alumina is calcined for about 4 hours at 1100° F. and impregnated with 0.6 wt. percent platinum in the manner described in Example 6. The remainder of the alumina is calcined for about 4 hours at 1500° F. and blended with the platinum-containing 40–80 micron material to give a mixture having a platinum content of 0.05 wt. percent. This catalyst is designated Catalyst F.

The results of an attrition test on Catalysts D, E and F are shown in Table II. In this test 10 grams of the catalyst are subjected to the attriting action of a jet of air having a velocity of 450 ft./sec. for a period of 5 hours. The attrition apparatus is designed to allow elutriation and removal of the fines (0–10 micron particles) as they are formed. The fines are collected in a filter, weighed and analyzed for platinum. It can be noted that the loss of platinum to fines is much less in the case of Catalyst F than in the case of Catalysts D and E. Catalysts D, E and F all have good hydroforming activity. Catalysts E and F have excellent hydroforming selectivity while catalyst D has poor hydroforming selectivity. Because of the low loss of platinum shown by Catalyst F it may be used to excellent advantage in a fluidized solids hydroforming operation in either a captive fluid bed or in a system wherein the catalyst is circulated between a reaction and a regeneration or reactivation zone or bed.

Table II

| Catalyst | D | E | F |
| --- | --- | --- | --- |
| Wt. Percent of Fines Formed | 15.5 | 19 | 18.5 |
| Platinum Content of Fines, Wt. Percent | 0.05 | 0.05 | 0.017 |
| Percent of Total Platinum Lost to Fines | 15.5 | 19 | 6.2 |

The foregoing disclosure contains a limited number of embodiments of the present invention. It will be understood, however, that this invention is not limited thereto since numerous variations are possible without departing from the scope of this invention.

What is claimed is:

1. A method of preparing hydroforming catalysts of high activity and selectivity characteristics which comprises spray drying a high purity alumina hydrosol to form alumina microspheres, segregating the alumina particles in the size range of from 40 to 80 microns, incorporating from about 0.3 to 2.0 wt. percent platinum upon the 40 to 80 micron alumina particles to form a platinum catalyst concentrate, mixing the platinum catalyst concentrate with sufficient unplatinized finely divided adsorptive alumina to form a fluidizable final catalyst composition containing 0.005 to 0.2 wt. percent platinum.

2. The method as defined in claim 1 in which the solid diluent alumina has been calcined at temperatures of about 1400–1900° F.

3. The method as defined in claim 1 in which the solid diluent alumina has been treated with an alkaline treating agent at elevated temperatures.

4. A method of preparing hydroforming catalysts of high activity and selectivity characteristics which comprises spray drying a high purity alumina hydrosol to form alumina microspheres, subjecting the microspheres to attrition to break up the weaker particles, segregating the alumina particles in the size range of from 40 to 80 microns from the resultant alumina particles, incorporating from about 0.3 to 2.0 wt. percent platinum upon the 40 to 80 micron alumina particles to form a platinum catalyst concentrate, mixing the platinum catalyst concentrate with sufficient unplatinized finely divided adsorptive alumina to form a fluidizable final catalyst composition containing 0.005 to 0.2 wt. percent platinum.

5. A method of preparing hydroforming catalysts of high activity and selectivity characteristics which comprises spray drying a high purity alumina hydrosol to form alumina microspheres, calcining the alumina microspheres, segregating the alumina particles in the size range of from 40 to 80 microns, incorporating from about 0.3 to 2.0 wt. percent platinum upon the 40 to 80 micron alumina particles to form a platinum catalyst concentrate, mixing the platinum catalyst concentrate with sufficient unplatinized finely divided adsorptive alumina to form a fluidizable final catalyst composition containing 0.005 to 0.2 wt. percent platinum.

6. A method of preparing hydroforming catalysts of high activity and selectivity characteristics which comprises spray drying an alcoholate alumina hydrosol to form high purity alumina microspheres, segregating the alumina particles in the size range of from 40 to 80 microns, incorporating from about 0.3 to 2.0 wt. percent platinum upon the 40 to 80 micron alumina particles to form a platinum catalyst concentrate, mixing the platinum catalyst concentrate with sufficient unplatinized finely divided adsorptive alumina to form a fluidizable final catalyst composition containing 0.005 to 0.2 wt. percent platinum.

7. The method as defined in claim 6 in which the solid diluent alumina has been calcinated at temperatures of about 1400–1900° F.

8. The method as defined in claim 6 in which the solid diluent alumina has been treated with an alkaline treating agent at elevated temperatures.

9. A method of preparing hydroforming catalysts of high activity and selectivity characteristics which comprises spray drying an alcoholate alumina hydrosol to form high purity alumina microspheres, subjecting the microspheres to attrition to break up the weaker particles, segregating the alumina particles in the size range of from 40 to 80 microns from the resultant alumina particles, incorporating from about 0.3 to 2.0 wt. percent platinum upon the 40 to 80 micron alumina particles to form a platinum catalyst concentrate, mixing the platinum catalyst concentrate with sufficient unplatinized finely divided adsorptive alumina to form a fluidizable final catalyst composition containing 0.005 to 0.2 wt. percent platinum.

10. A method of preparing hydroforming catalysts of high activity and selectivity characteristics which comprises spray drying an alcoholate alumina hydrosol to form high purity alumina microspheres, calcining the alumina microspheres, segregating the alumina particles in the size range of from 40 to 80 microns, incorporating from about 0.3 to 2.0 wt. percent platinum upon the 40 to 80 micron alumina particles to form a platinum catalyst concentrate, mixing the platinum catalyst concentrate with sufficient unplatinized finely divided adsorptive alumina to form a fluidizable final catalyst composition containing 0.005 to 0.2 wt. percent platinum.

References Cited in the file of this patent

UNITED STATES PATENTS

| | | |
|---|---|---|
| 1,505,162 | Nowak | Aug. 19, 1924 |
| 2,387,596 | Marisic | Oct. 23, 1945 |
| 2,448,439 | Kimberlin et al. | Aug. 31, 1948 |
| 2,636,865 | Kimberlin | Apr. 28, 1953 |
| 2,669,547 | Shabaker | Feb. 16, 1954 |
| 2,708,187 | Kearby | May 10, 1955 |
| 2,734,022 | Kimberlin | Feb. 7, 1956 |
| 2,741,602 | McKinley et al. | April 10, 1956 |